United States Patent Office

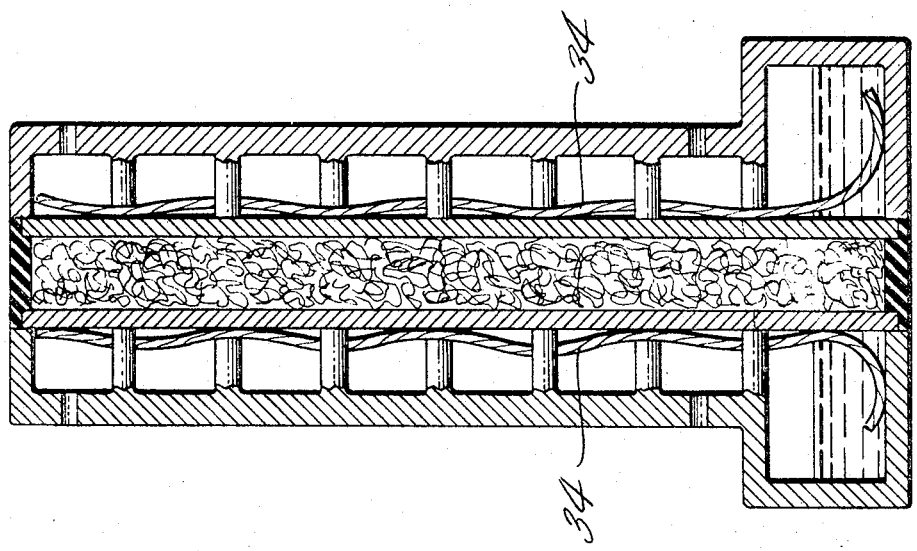
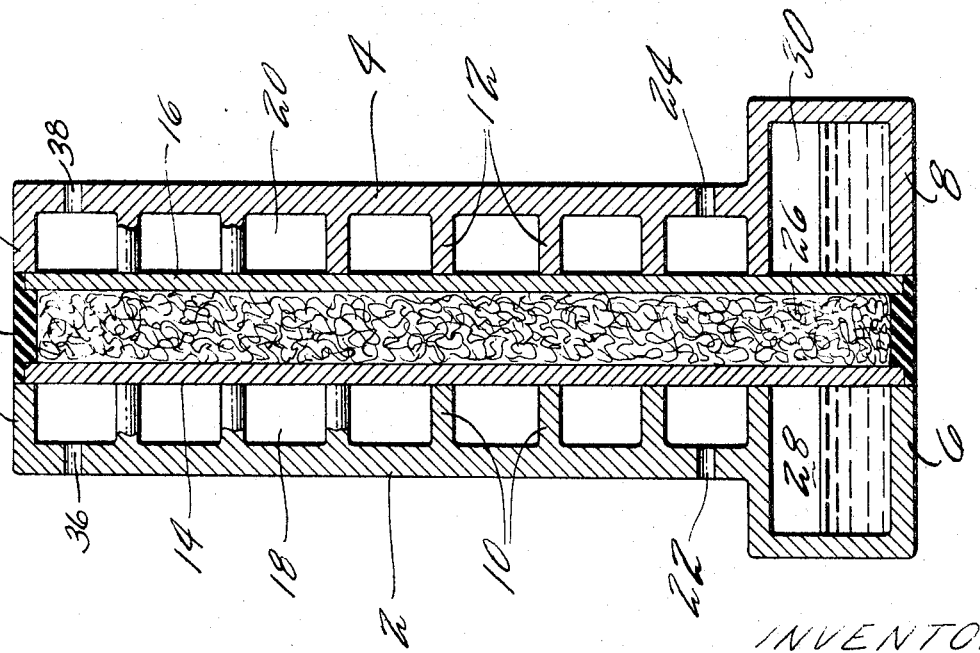

3,519,486
Patented July 7, 1970

3,519,486
CONTROL OF ELECTROLYTE IN A FUEL CELL
Richard G. Huebscher, Mayfield Village, and Thomas H. Hacha, Willoughby, Ohio, assignors, by mesne assignments, to United Aircraft Corporation, East Hartford, Conn., a corporation of Delaware
Filed Oct. 6, 1966, Ser. No. 584,849
Int. Cl. H01m 27/00
U.S. Cl. 136—86
3 Claims

ABSTRACT OF THE DISCLOSURE

A trapped electrolyte fuel cell is disclosed wherein excess electrolyte seeps through the electrodes and is allowed to drain down the sides of the electrodes into the electrolyte reservoir at the bottom of the cell. When operating conditions require additional electrolyte, the electrolyte within the reservoir is absorbed by the matrix and carried up into the operative portions of the cell by capillary action.

---

This invention relates to a fuel cell and more particularly to an arrangement for absorbing excess electrolyte from or supplying additional electrolyte to the electrolyte matrix in accordance with the demands on the cell.

In a conventional trapped electrolyte cell, as the electrolyte carried by the matrix increases in volume by the addition of water due to the interaction of the fuel and oxidant and/or a change in operating parameters, the excess electrolyte may be forced through the electrodes with the resultant drowning of areas of the electrode. A feature of this invention is a chamber or chambers in the fuel cell into which an excess of electrolyte may be discharged as the volume of electrolyte increases. Another feature is the use of this reservoir to allow the return of needed quantities of electrolyte to the electrolyte matrix and to this extent the matrix and/or the electrodes communicate with the pool or pools of electrolyte in the chamber or chambers. In this way, capillary action will draw electrolyte back into the matrix and into the electrodes when the volume of the electrolyte decreases by reason of changing cell conditions.

This application is in certain respects a modification of the copending application of Frank Roberts, Jr., Ser. No. 564,984, filed July 13, 1966, now U.S. Pat. 3,442,712 and having the same assignee as the present application.

Other features and advantages will be apparent from the specification and claims and from the accompanying drawing which illustrates an embodiment of the invention.

FIG. 1 is a transverse sectional view through a fuel cell incorporating the invention.

FIG. 2 is a sectional view similar to FIG. 1 showing a modification.

Referring first to FIG. 1, the invention is shown in connection with a fuel cell of the trapped electrolyte type. The cell shown has cover plates 2 and 4 having edge flanges 6 and 8, respectively, each plate having a plurality of spaced projections 10 and 12 on the same side of the plate as the flanges. These flanges and projections support the electrodes 14 and 16, respectively, and the cover plates form with the electrodes spaces 18 and 20 for fuel and oxidant, respectively.

In the construction shown, the cell is a hydrogen-air cell, hydrogen being supplied to the space 18 through a fuel inlet 22 and air being supplied to the space 20 through an oxidant inlet 24. Purge outlets 36 and 38 are also provided for the hydrogen gas space and the air gas space, respectively. The cell may be a low pressure cell with the hydrogen and air supplied at pressures slightly above atmospheric or the cell may operate at higher pressures, for example, as high as 250 p.s.i.

Between the electrodes is a matrix 26 in the electrolyte space retaining within its interstices the fluid electrolyte, for example, an aqueous solution of KOH which may be a 40 percent solution. The matrix is made of a material resistant to KOH, for example, a fibrous asbestos matting. The electrodes have their edges spaced inwardly from the outer peripheries of the cover plate where they engage the flanges on the plates to accommodate a seal 27 that serves to seal the periphery of the cell, and to form a closure for the electrolyte space between the opposing electrodes.

The electrodes may be any of the conventional electrodes or the catalyzed impregnated screen type. The particular fuel cell construction is not critical other than as above described except that there be the fuel and oxygen spaces on the gas sides of the electrodes, and a capillary matrix between and in close contact with the electrodes, and at least one of said electrodes is waterproofed or partially waterproofed.

In accordance with the present invention, the cover plates 2 and 4 are provided adjacent the bottom edge of the fuel cell with somewhat larger openings 28 and 30 therein to form a chamber through or across which the matrix and the electrodes extend thereby, in effect, creating two chambers, one on each side of the cell but communicating through the porosity of the electrodes and matrix with one another. This chamber, or, in effect, these chambers will receive excess electrolyte which may drain and be accumulated therein if the volume of the electrolyte becomes more than can be accommodated between the two electrodes and within the interstices of the electrodes. The chambers or spaces 28 or 30 thus provided are open to the gas spaces 18 and 20 respectively of the fuel cell but are separated one from the other by the matrix and electrodes. The electrode areas immediately adjacent to these chambers are preferably devoid of waterproofing, allowing free access of electrolyte in these chambers to the matrix. The matrix provides a gas-tight barrier between the two chambers. By providing proper control of the pressures in the gas spaces, one or the other of the two chambers could be omitted without changing the concept or operation involved in this invention. As excess electrolyte occurs within the cell by reason of the dilution of the electrolyte with water due to a change in the operating parameters, the chambers become more or less filled with the excess electrolyte which seeps through the matrix and through the electrodes and/or runs down the gas sides of the electrodes into the spaces 28 and/or 30. In this way, the electrolyte accumulates in pools at the bottom of the cell during conditions when excess electrolyte occurs.

On the other hand, when the cell operating conditions are such that the electrolyte decreases in volume, the electrolyte within the pools can be absorbed by the matrix in the electrolyte space and/or by the electrodes and this electrolyte is then carried up into the operative portions of the electrodes so that there will always be an adequate amount of electrolyte to maintain the gas liquid inerface in the proper position between the opposing surfaces of each electrode.

The capillary attraction of the matrix and of the electrodes is such that the electrolyte will be absorbed whenever needed within the fuel cell and will be retained therein so that the cell will operate at most favorable conditions, regardless of the actual quantity of electrolyte within the cell. The arrangement of this device is such that any drops of liquid electrolyte that may form on the gas surfaces of the electrodes will drain directly into the pools and thereby minimize flooding and permit the cell to operate at its maximum potential under all operating conditions. If the electrodes are nonwettable, as above described, the droplets that may accumulate on the gas surfaces of the electrodes during operating conditions in which additional electrolyte is formed will quickly be attracted by gravity into the chambers in which the excess electrolyte is accumulating.

It is well known that this type of fuel cell requires a control of electrolyte-gas interface to a position within the thickness of each of the electrodes. If either electrode or any portion thereof becomes dry, the gas leaks into the electrode space without reacting through the electrolyte with the other gas to produce the electricity desired from the cell. By having the matrix and electrodes dip into a pool of electrolyte, as shown, the electrolyte is wicked into the matrix and the electrodes. The interface position between the electrolyte and the gases is determined by the capillary characteristics of the electrode and the matrix and is not determined any longer by the volume of electrolyte in the fuel cell.

The water tolerance of cells without a device for accommodating excess electrolyte, as in the present application, is bounded on the wet side of operation by electrolyte completely filling and drowning the electrodes or preventing operative functioning of the fuel cell by masking the electrodes with excess electrolyte accumulation in the gas chamber and on the dry side by electrolyte shrinkage to the point that electrolyte-electrode contact is lost with resultant gas leakage into the matrix.

By the present invention, the operation on the wet side is no longer limited by flooding since the excess electrolyte can drain into the collecting pool and operation of the fuel cell can continue until the pool volume is exceeded. On the dry side, the operation of the cell is limited only by complete loss of excess electrolyte from the pool since so long as there is available electrolyte within the pool the necessary interface between the electrolyte and the gas will occur within the confines of the individual electrodes. With this invention, a wet-proof electrode functions adequately both while draining product water and electrolyte into the pool during the period when water production exceeds water removal and also during those periods when the electrolyte is wicking from the pool back into the electrode and matrix when water removal exceeds the production of water during the cell operation.

A modification of the device, as shown in FIG. 2, adds to the accumulating pools of FIG. 1, wicking material 34 located in the gas spaces of the fuel cell, and so arranged that they will carry electrolyte from the pools over the surfaces of the electrodes and supply electrolyte not only to the lower portions of the electrodes and matrix which are immersed in the pools but also to spaced portions of the remainder of the electrodes during the fuel cell operation. This wicking material may be a series of spaced strips so arranged that they contact either continuously or intermittently with the gas surface of each of the electrodes as clearly shown in FIG. 2. This wicking may obviously be of much the same material as the matrix of the electrolyte space or it may be any other material having wicking characteristics that will remain wet with the electrolyte but which will readily give up electrolyte to the electrode whenever required. In this way, the wicking will assure that electrolyte is supplied to those portions of the electrode that may tend to dry out during cell operation when more water is being removed than is being formed within the cell.

It is to be understood that the invention is not limited to the specific embodiment herein illustrated and described but may be used in other ways without departure from its spirit as defined by the following claims.

We claim:

1. The combination in a fuel cell of opposed electrodes, at least one of which is water-proofed or partially water-proofed, said electrodes being spaced apart to form an electrolyte space therebetween, a capillary matrix containing electrolyte in said space and cover plates cooperating with the electrodes and located on the sides of the electrodes opposite to the matrix in spaced relation to the electrodes to form gas spaces on the sides of electrodes opposite to the matrix, a liquid electrolyte containing reservoir/collection chamber attached to the fuel cell into which the matrix extends, the chamber being open to the gas space on the side of the waterproofed electrode such that excess electrolyte drops that form on the gas surface of the electrode may drain into the reservoir/collection chamber.

2. The combination as in claim 1 wherein the matrix and the waterproofed electrode extend into the reservoir/collection chamber.

3. The combination as in claim 2 wherein the electrode is waterproofed above the portion extending into the reservoir/collection chamber.

References Cited

UNITED STATES PATENTS

| | | | |
|---|---|---|---|
| 3,005,943 | 10/1961 | Jaffe | 320—13 |
| 3,202,547 | 8/1965 | Rightmire et al. | 136—86 |
| 3,364,071 | 1/1968 | Kordesch | 136—86 |

JOHN H. MACK, Primary Examiner

H. A. FEELEY, Assistant Examiner